(12) United States Patent
Buhrke

(10) Patent No.: US 10,859,144 B2
(45) Date of Patent: Dec. 8, 2020

(54) DRIVE TRAIN FOR AN AGRICULTURAL WORKING VEHICLE

(71) Applicant: Deere & Company, Moline, IL (US)

(72) Inventor: Frank Buhrke, Birkenau (DE)

(73) Assignee: DEERE & COMPANY, Moline, IL (US)

( * ) Notice: Subject to any disclaimer, the term of this patent is extended or adjusted under 35 U.S.C. 154(b) by 140 days.

(21) Appl. No.: 15/564,804

(22) PCT Filed: Apr. 4, 2016

(86) PCT No.: PCT/EP2016/057345
§ 371 (c)(1),
(2) Date: Oct. 6, 2017

(87) PCT Pub. No.: WO2016/162304
PCT Pub. Date: Oct. 13, 2016

(65) Prior Publication Data
US 2018/0112754 A1    Apr. 26, 2018

(30) Foreign Application Priority Data
Apr. 7, 2015    (DE) .......................... 10 2015 206 160

(51) Int. Cl.
*F16H 37/04*    (2006.01)
(52) U.S. Cl.
CPC .......... *F16H 37/043* (2013.01); *F16H 37/042* (2013.01); *F16H 2037/045* (2013.01)
(58) Field of Classification Search
CPC ................. F16H 37/042; F16H 37/043; F16H 2037/045; F16H 3/006; F16H 3/091; F16H 3/093; F16H 2003/0803
See application file for complete search history.

(56) References Cited

U.S. PATENT DOCUMENTS 3,468,192 A * 9/1969 Nasvytis ................. F16H 3/728
                                                          475/75
3,527,119 A * 9/1970 Nasvytis ................ F16H 37/084
                                                          475/218
(Continued)

FOREIGN PATENT DOCUMENTS

DE            2645957 A1    4/1978
DE      102005030987 A1    1/2007
(Continued)

OTHER PUBLICATIONS

WO International Search Report issued in counterpart application No. PCT/EP2016/057345 dated Jun. 24, 2016. (16 pages).
(Continued)

*Primary Examiner* — Richard W Ridley
*Assistant Examiner* — Brian J McGovern

(57) ABSTRACT

The invention relates to a drive train (20) for an agricultural working vehicle (10), comprising a drive motor (22), a main transmission (24), a vehicle axle (26) driven by means of the drive motor (22) and the main transmission (30), and a post-transmission (60), which is arranged between the main transmission (30) and the vehicle axle (26) and has at least two gear ratios, characterized in that a first gear ratio can be selected by means of a first shifting element (64) arranged on a main shaft (62) of the post-transmission (60) and a second gear ratio can be selected by means of a second shifting element (68) arranged on a countershaft (66) of the post-transmission (60).

12 Claims, 2 Drawing Sheets

(56) References Cited

U.S. PATENT DOCUMENTS

Figure 1:
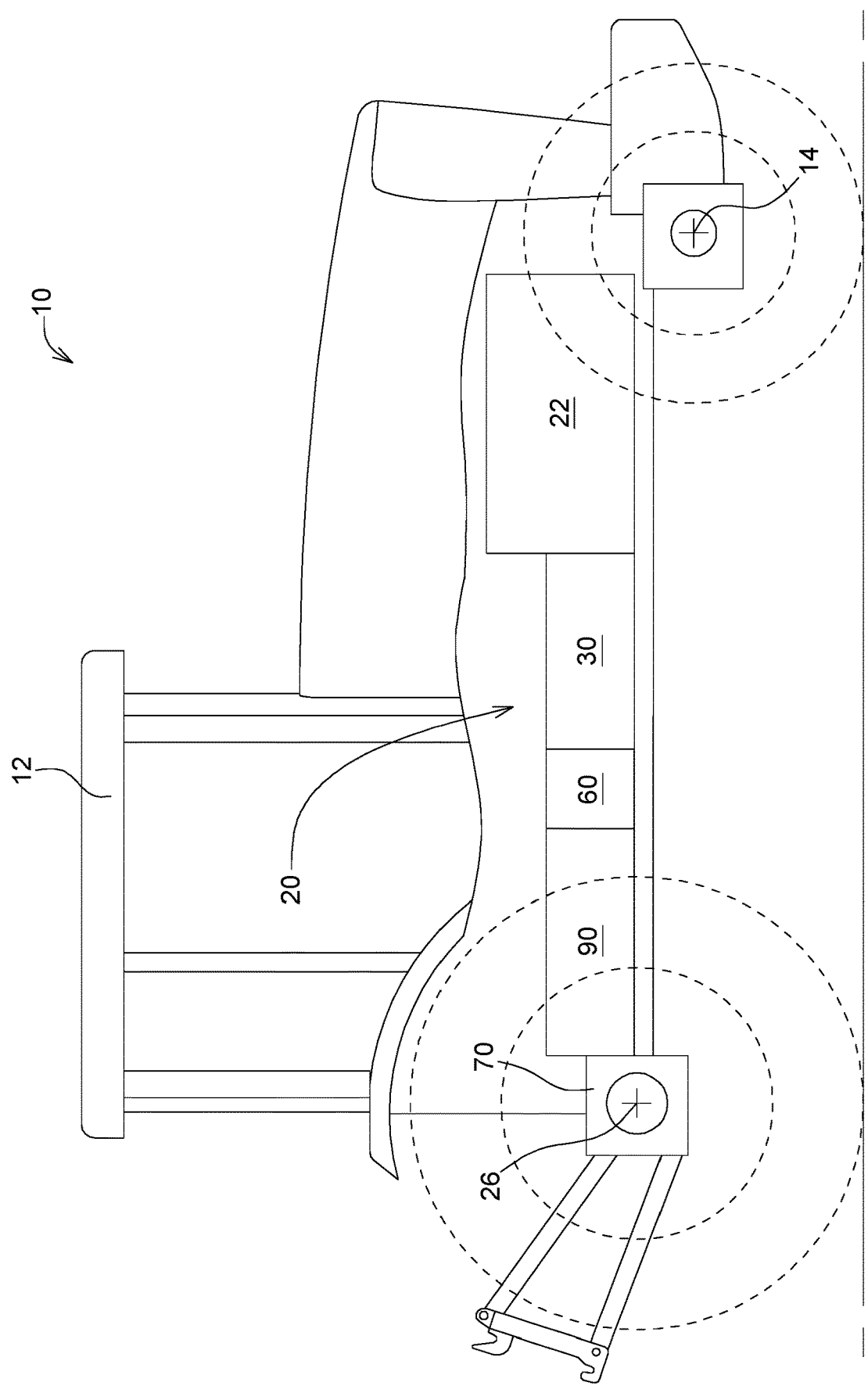

| | | | |
|---|---|---|---|
| 4,858,495 A | 8/1989 | Horsch | |
| 2003/0036452 A1* | 2/2003 | Fuhrer | F16H 37/046 |
| | | | 475/207 |
| 2008/0245167 A1* | 10/2008 | Gitt | F16H 3/006 |
| | | | 74/331 |
| 2009/0205450 A1* | 8/2009 | Gitt | F16H 3/0915 |
| | | | 74/325 |
| 2013/0337961 A1* | 12/2013 | Kaltenbach | B60K 6/48 |
| | | | 475/207 |
| 2014/0196556 A1* | 7/2014 | Beck | F16H 3/006 |
| | | | 74/331 |
| 2017/0114865 A1* | 4/2017 | Gugel | F16H 37/042 |

FOREIGN PATENT DOCUMENTS

| | | |
|---|---|---|
| DE | 102011081520 A1 | 3/2012 |
| DE | 102011080562 A1 | 2/2013 |
| DE | 102013110709 A1 | 4/2015 |

OTHER PUBLICATIONS

German Search Report issued in counterpart Patent Application No. 102015206160.4 dated Jun. 10, 2016, 8 pages.

Naunheimer et al., Vehicle Transmission—Foundations, Selection, Layout and Design, ISBN 9783540306252, 2007, 10 pages, Springer-Verlag Berlin Heidelberg New York.

European Office Action issued in counterpart Patent Application No. 16714408.8 dated Feb. 11, 2020, 6 pages.

* cited by examiner

DRIVE TRAIN FOR AN AGRICULTURAL WORKING VEHICLE

The invention relates to a drive train for an agricultural working vehicle, comprising a drive engine, a transmission, and a vehicle axle which is driven via the drive engine and the transmission, and a rear-mounted transmission with at least two transmission ratios which is arranged between the transmission and the vehicle axle.

In working vehicles, in particular agricultural utility vehicles such as tractors, transmission arrangements with a multiplicity of gears are used as a rule, as long as continuously variable transmissions are not used. Transmission arrangements are known in the prior art which have a plurality of transmission units which are arranged behind one another. Transmission arrangements of this type serve to meet the high requirements in relation to stepping which is as finely graduated as possible, but also a broad spread of the transmission ratios. Thus, for example, a typical configuration of a transmission arrangement can consist of a multiple-stage main transmission and a downstream range group. In agricultural utility vehicles, what are known as reversing units and, if required, crawler gear step-down transmission ratios are additionally provided. The main transmission is as a rule of power-shift design, it being possible in principle for it to be constructed as a planetary gear mechanism or as a parallel shift transmission. There is fundamentally a conflict of objectives between desired functionality and available installation space in the design of transmission and drive components. Thus, for example, the number of power-shift gears usually lies at from 3 to 5 in tractors of the 130 hp class. In functionality respects, however, 6 or 8 power-shift gears would be desirable both for field work and for transport work. Even if this can be provided within a framework which is justifiable in price terms, there is still the problem to be solved of integrating said additional power-shift gears into the existing installation space.

DE 10 2005 030 987 A1 describes a drive train with a double clutch transmission as main transmission and a downstream rear-mounted transmission. The rear-mounted transmission is of countershaft design. Via a shifting device, direct through-connected drive via the main shaft is established in a first shifting position, and a drive via the countershaft is established in a second shifting position. It might be considered insufficient here that the switchover within the rear-mounted transmission cannot take place under load, since only one shifting device is provided for both transmission ratios.

Proceeding herefrom, it is the object of the present invention to provide functionality in a drive train which is further improved with regard to the power-shift capability.

The object is achieved by way of a drive train for an agricultural working vehicle, comprising a drive engine, a main transmission and a vehicle axle which is driven via the drive engine and the transmission, and a rear-mounted transmission with at least two transmission ratios which is arranged between the main transmission and the vehicle axle, it being possible for a first transmission ratio to be selected via a first shifting element which is arranged on a main shaft of the rear-mounted transmission, and for a second transmission ratio to be selected via a second shifting element which is arranged on a countershaft of the rear-mounted transmission.

According to the invention, a power-shift rear-mounted transmission is provided, as a result of which, in combination with an existing, likewise power-shift main transmission, doubling of the number of gears of said main transmission is achieved.

The first and the second shifting element are preferably configured as hydraulically actuated wet clutches. The hydraulic actuation of the two shifting elements can be linked to the hydraulic control of the main transmission.

The main transmission is preferably configured as a power-shift transmission with geometric stepping of approximately 20%. This leads to close spacing of the gears with a simultaneously great spread of the transmission.

A group transmission is preferably arranged between the rear-mounted transmission and the vehicle axle. The spread of the transmission can be increased further as a result, and a high vehicle end speed with a reduced engine speed can be achieved at the same time.

The rear-mounted transmission is preferably configured in a countershaft design. This can be provided simply in structural terms.

A spur gear of an output-side spur gear stage of the rear-mounted transmission is preferably an integral constituent part of the group transmission. As a result, the rear-mounted transmission relies on a component which is already present in any case in the group transmission, with the result that costs are saved.

The output-side spur gear stage of the rear-mounted transmission is preferably arranged in a housing of the group transmission. As a result, the increase in the axial width of the drive train as a consequence of the installation of the rear-mounted transmission can be limited to a minimum.

Furthermore, the object is achieved by way of a method for controlling a drive train as claimed in one of claims 1 to 7 with a third shifting element which is suitable as a start-up clutch between the drive engine and the rear-mounted transmission, in which method, during a switchover of the power flow from the first or second shifting element to the respective other shifting element, the third shifting element is modulated in order to interrupt the drive power. It is possible as a result to design the first and second shifting element with a reduced clutch capacity, since at least part of the slip which is required during a shifting operation for rotational speed harmonization is ensured by way of the third shifting element which is designed as a matter of principle with a high clutch capacity.

Figure 2:
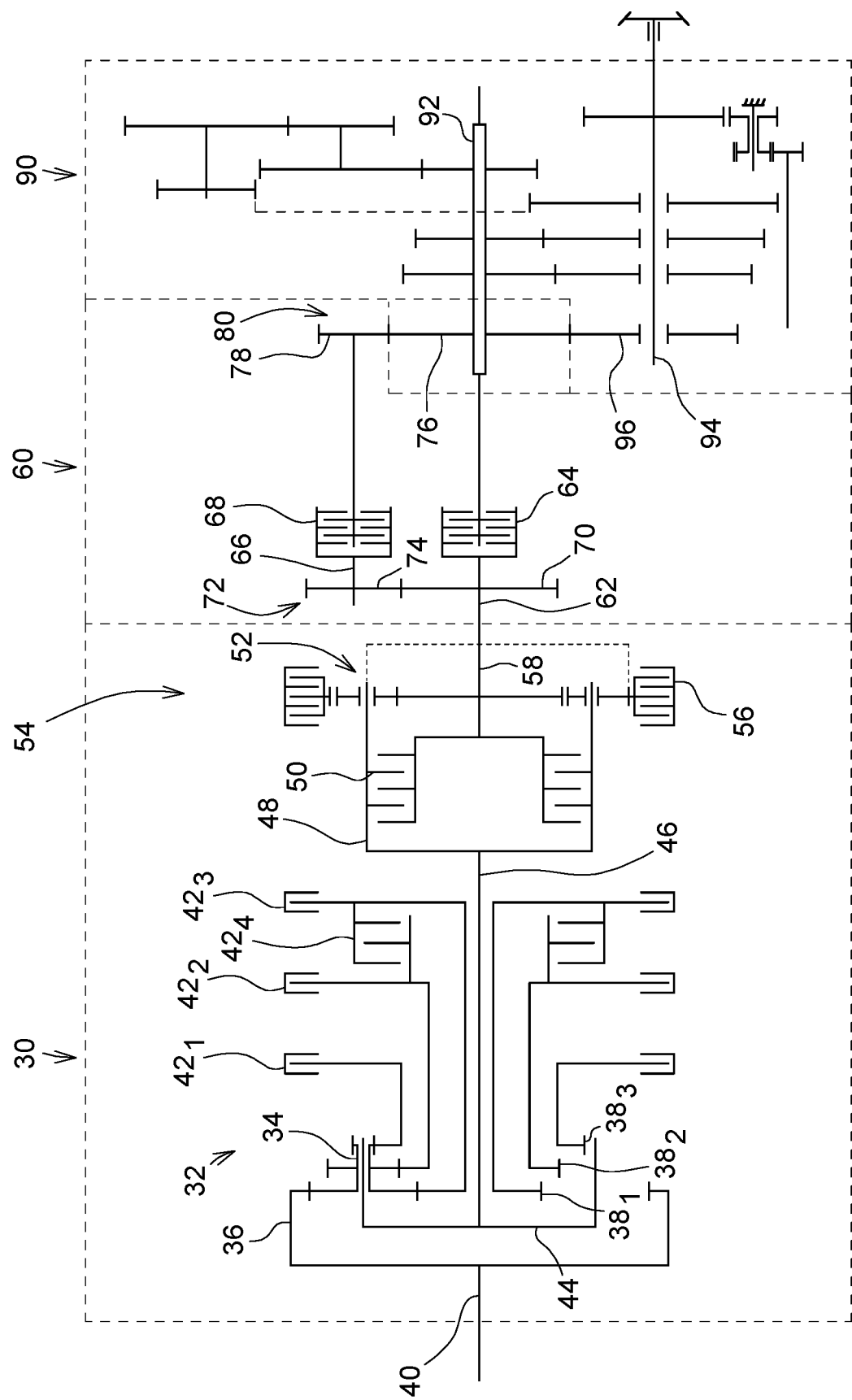

The present invention will be described using the following figures, in which:

FIG. 1 shows an agricultural working vehicle with a drive train according to the invention, and FIG. 2 shows a transmission diagram of a drive train according to the invention.

FIG. 1 shows an agricultural working vehicle 10 in the form of a tractor with a drive train 20 according to the invention in one possible embodiment. Furthermore, the working vehicle 10 comprises a cab 12, a front vehicle axle 14 and a rear vehicle axle 26. The front vehicle axle 14 and the rear vehicle axle 26 are part of the drive train 20, the rear vehicle axle 26 as a rule being driven permanently, and the front vehicle axle 14 as a rule being driven such that it can be connected as required.

Furthermore, the drive train 20 comprises a drive engine 22 which can be configured as an internal combustion engine, and a transmission structure which, as described in the following text, can be assembled from different individual transmission components. In the transmission structure which is described in the present case, a main transmission 30, a rear-mounted transmission 60, a group transmission 90 and a differential gear can be provided in the power and torque flow, starting from the drive engine 22. The main transmission 30 can be configured as a parallel shift transmission or as a planetary gear mechanism. Furthermore, a reversing unit can be integrated into the main transmission 30. An illustration of the output of the front wheel drive which can be connected as required from the group transmission 90 has been dispensed with.

FIG. 2 shows a transmission ratio of the transmission structure which has been described above as a possible configuration, with a main transmission 30, a rear-mounted transmission 60 and a group transmission 90. In the present case, the main transmission 30 is equipped with a planetary gear mechanism 32 with four transmission ratios. Here, a triple planetary drum 34 meshes firstly with an internal gear 36 and secondly with three sun gears $38_1$, $38_2$, $38_3$. The internal gear 36 is connected in drive terms to a drive shaft 40 which for its part receives a drive torque from the drive engine 22. Each of the three sun gears $38_1$, $38_2$, $38_3$ can be held via in each case one of the three shifting elements $42_1$, $42_2$, $42_3$ against rotation with respect to a stationary component, for example a housing, of the main transmission 30. A further shifting element $42_4$ is provided, in order to establish a fixed connection so as to rotate together between the sun gears $38_2$ and $38_3$. An output takes place via the planetary gear carrier 44 to an intermediate shaft 46. The intermediate shaft 46 drives a drive element 48 which serves firstly as a clutch basket for a shifting element 50 which is suitable as a start-up clutch and secondly as a planetary gear carrier for a planetary gear mechanism 52 of a reversing unit 54. Reversing takes place via closure of a further shifting element 56 with a simultaneously open shifting element 50; forward drive takes place as a consequence with a closed shifting element 50 and an open shifting element 56. An output shaft 58 is correspondingly driven either via the shifting element 50 or via the planetary gear mechanism 52 in the case of a closed shifting element 56.

In the possible configuration described in the present case of a transmission structure, the power and torque flow leaves the main transmission 30 via the output shaft 58 and is transferred to a main shaft 62 of the rear-mounted transmission 60. The rear-mounted transmission 60 can be configured in a countershaft design. A fixed gear 70 and a shifting element 64 are arranged on the main shaft 62. A power and torque flow via the main shaft 62 can be switched or interrupted by way of the shifting element 64. The fixed gear 70 is part of an input-side spur gear stage 72 and meshes with a fixed gear 74 on a countershaft 66. A further shifting element 68 is arranged on the countershaft 66. A power and torque flow via the countershaft 68 can be switched or interrupted by way of the shifting element 66. Furthermore, a fixed gear 76 is arranged on the main shaft 62 and a fixed gear 78 is arranged on the countershaft 66, which fixed gears 76, 78 form an output-side spur gear stage 80.

As shown in the present case, a group transmission 90 can be arranged downstream in the power and torque flow. The group transmission 90 can be configured in a countershaft design with a main shaft 92 and a countershaft 94. In the present case, the group transmission 90 comprises four shifting groups, with the result that four gearwheel pairings are provided in three gearwheel planes. Each gearwheel pairing consists in each case of a fixed gear and a movable gear. In the case of the group transmission 90 which is shown, the fixed gears are assigned to the main shaft 92 and the movable gears are assigned to the countershaft 94, which is merely one possible configuration, however. In the context of this description, merely the gearwheel pairing on the extreme left (shown in FIG. 2), consisting of the fixed gear 76 which has already been described in conjunction with the rear-mounted transmission 60 and the movable gear 96, will be described. There is no further description of the group transmission 90.

From a functional viewpoint, the rear-mounted transmission 60 and the group transmission 90 share the fixed gear 76. As has already been described, the fixed gear 76, together with the fixed gear 78, forms the output-side spur gear stage 80 of the rear-mounted transmission 60. Moreover, the fixed gear 76, together with the movable gear 96 which is arranged on the countershaft 94, forms one of the shifting groups of the group transmission 90. Despite a rear-mounted transmission 60 which is arranged between the main transmission 30 and the group transmission 90, this therefore results in only a small increase in the axial width of the overall arrangement, since the output-side spur gear stage 80 of the rear-mounted transmission 60 and one of the shifting groups of the group transmission 90 are integrated functionally.

The following table is to show, by way of example, some transmission ratios and output rotational speeds in revolutions per minute of the main transmission 30, rotational speeds in revolutions per minute of the main shaft 92 of the group transmission 90, and traveling speeds in kilometers per hour of the working vehicle. The case has been assumed that the rotational speed of the drive engine is 2100 revolutions per minute, the main transmission 30 comprises four shifting stages, and the group transmission 90 is operated in the switching group with the shortest transmission which can be denoted as shifting group A.

| Shifting stage | Transmission ratio, main transmission | Output rotational speed, main transmission | Input rotational speed, group transmission | Traveling speed |
|---|---|---|---|---|
| A1 | 0.566 | 1189 | 1189 | 2.4 |
| A2 | 0.682 | 1432 | 1432 | 2.89 |
| A3 | 0.816 | 1714 | 1714 | 3.46 |
| A4 | 1 | 2100 | 2100 | 4.23 |
| A5 | 0.566 | 1189 | 2566 | 5.17 |
| A6 | 0.682 | 1432 | 3091 | 6.23 |
| A7 | 0.816 | 1714 | 3699 | 7.46 |
| A8 | 1 | 2100 | 4533 | 9.14 |

It can be seen that the sequence of the transmission ratios from 0.566 to 1 of the main transmission 30 are passed through twice. While the transmission ratios are passed through a first time, the power and torque flow is shifted via the main shaft 62 and the shifting element 64 of the rear-mounted transmission 60. The transmission ratios are passed through a second time when the power and torque flow is shifted via the countershaft 66 and the shifting element 68 of the rear-mounted transmission 60.

LIST OF DESIGNATIONS

10 Agricultural working vehicle
12 Cab
14 Vehicle axle
20 Drive train
22 Drive engine
26 Vehicle axle
30 Main transmission
32 Planetary gear mechanism
34 Planetary drum
36 Internal gear
38 Sun gear 40 Drive shaft
42 Shifting element
44 Planetary gear carrier
46 Intermediate shaft
48 Drive element
50 Shifting element
52 Planetary gear mechanism
54 Reversing unit
56 Shifting element
58 Output shaft
60 Rear-mounted transmission
62 Main shaft
64 Shifting element
66 Countershaft
68 Shifting element
70 Fixed gear
72 Spur gear stage
74 Fixed gear
76 Fixed gear
78 Fixed gear
80 Spur gear stage
90 Group transmission
92 Main shaft
94 Countershaft
100 Differential gear

The invention claimed is:

1. A drive train for an agricultural working vehicle, comprising:
a drive engine,
a main transmission including an output shaft,
a vehicle axle which is driven via the drive engine and the main transmission,
a rear-mounted transmission including a first transmission ratio and a second transmission ratio which is arranged between the main transmission and the vehicle axle, the output shaft of the main transmission coupled to and transferring power to a main shaft of the rear-mounted transmission, and
an output gear arranged on the main shaft of the rear-mounted transmission,
the first transmission ratio can be selected via a first clutch arranged on the main shaft of the rear-mounted transmission, and the second transmission ratio can be selected via a second clutch arranged on a countershaft of the rear-mounted transmission, the first and second transmission ratios providing power to the output gear.

2. The drive train of claim 1, wherein the first and second clutches are configured as hydraulically actuated wet clutches.

3. The drive train of claim 1 or 2, wherein the main transmission is configured as a power-shift transmission with geometric stepping of approximately 20%.

4. The drive train of claim 1 or 2, further comprising a group transmission arranged between the rear-mounted transmission and the vehicle axle.

5. The drive train of claim 4, wherein the rear-mounted transmission is of countershaft design.

6. The drive train of claim 4, wherein the output gear of an output-side spur gear stage of the rear-mounted transmission is an integral constituent part of the group transmission.

7. The drive train of claim 6, wherein the output-side spur gear stage of the rear-mounted transmission is arranged in a housing of the group transmission.

8. The drive train of claim 1 or 2, further comprising a third clutch configured as a start-up clutch between the drive engine and the rear-mounted transmission, in which during a switchover of the power flow from the first or second clutch to the respective other first or second clutch, the third clutch is modulated in order to interrupt the drive power.

9. The drive train of claim 1, wherein during the first transmission ratio, power flows into and out of the rear-mounted transmission via the main shaft of the rear-mounted transmission.

10. The drive train of claim 1, wherein during the second transmission ratio, power flows from the main shaft of the rear-mounted transmission to the countershaft, and then back to the main shaft of the rear-mounted transmission.

11. A drive train for an agricultural working vehicle, comprising:
a drive engine;
a main transmission including an output shaft;
a vehicle axle which is driven via the drive engine and the main transmission;
a rear-mounted transmission including a first clutch arranged on a main shaft and a second clutch arranged on a countershaft, the rear-mounted transmission arranged between the main transmission and the vehicle axle, the output shaft of the main transmission coupled to and transferring power to the main shaft of the rear-mounted transmission; and
wherein the first transmission ratio can be selected via the first clutch resulting in power flowing through the rear-mounted transmission via the main shaft, and the second transmission ratio can be selected via a second clutch resulting in power flowing from the main shaft to the countershaft and then back to the main shaft of the rear-mounted transmission.

12. The drive train of claim 11, further comprising an output gear arranged on the main shaft of the rear-mounted transmission, the rear-mounted transmission provides power to the output gear in both the first and second transmission ratios.

* * * * *